(12) United States Patent
Kubota et al.

(10) Patent No.: US 9,129,067 B2
(45) Date of Patent: Sep. 8, 2015

(54) POSITION DETECTOR

(71) Applicant: DENSO CORPORATION, Kariya, Aichi-pref. (JP)

(72) Inventors: Takamitsu Kubota, Chiryu (JP); Tohru Shimizu, Nagoya (JP); Tetsuya Hara, Kariya (JP); Yoshiyuki Kono, Obu (JP)

(73) Assignee: DENSO CORPORATION, Kariya (JP)

( * ) Notice: Subject to any disclaimer, the term of this patent is extended or adjusted under 35 U.S.C. 154(b) by 165 days.

(21) Appl. No.: 13/683,364

(22) Filed: Nov. 21, 2012

(65) Prior Publication Data

US 2013/0132018 A1     May 23, 2013

(30) Foreign Application Priority Data

Nov. 22, 2011   (JP) .................................. 2011-254956

(51) Int. Cl.
| G06F 17/40 | (2006.01) |
| G01D 5/14 | (2006.01) |
| G01D 5/244 | (2006.01) |
| B60W 50/023 | (2012.01) |
| B60K 26/04 | (2006.01) |

(52) U.S. Cl.
CPC ............... *G06F 17/40* (2013.01); *B60K 26/04* (2013.01); *B60W 50/023* (2013.01); *G01D 5/145* (2013.01); *G01D 5/24447* (2013.01); *G01D 5/24476* (2013.01); *B60K 2026/046* (2013.01); *B60W 2510/0604* (2013.01); *B60W 2540/10* (2013.01)

(58) Field of Classification Search
CPC ... G06F 11/1441; G06F 11/2015; G06F 1/30; G06F 12/0866; G06F 2201/86; G06F 2212/312; G06F 11/14; G06F 11/2094; G06F 17/40; G11C 5/141; G01D 5/145; G01D 5/24447; G01D 5/24476; B60K 26/04; B60K 2026/046; B60W 50/023; B60W 2540/10; B60W 2510/0604

USPC .............. 702/94, 35, 36, 38, 57, 58, 115, 120
See application file for complete search history.

(56) References Cited

U.S. PATENT DOCUMENTS 4,234,920 A  *  11/1980  Van Ness et al. ............... 714/22
7,369,969 B2     5/2008  Scherr
(Continued)

FOREIGN PATENT DOCUMENTS

JP      2011-204026      10/2011

OTHER PUBLICATIONS

Office Action (8 pages) dated Jan. 6, 2015, issued in corresponding Chinese Application No. 201210477892.5 and English translation (13 pages).

*Primary Examiner* — Eliseo Ramos Feliciano
*Assistant Examiner* — Yoshihisa Ishizuka
(74) *Attorney, Agent, or Firm* — Nixon & Vanderhye P.C.

(57) ABSTRACT

In a position detector for detecting a position of a detection body, a signal processing circuit processes a signal outputted from a magnetic field detection element. A first storage circuit stores the signal outputted from the magnetic field detection element and outputs a signal to an external device through an output circuit in a normal operation mode. A second storage circuit stores an output value of the first storage circuit. When a malfunction determination circuit determines an instantaneous power interruption mode, a signal route changing circuit prevents a signal transmission between the first storage circuit and the second storage circuit and a signal transmission between the first storage circuit and the output circuit, prevents the second storage circuit from updating data for a certain period of time, and permits the second storage circuit in which updating is prevented to output a signal to the output circuit.

7 Claims, 5 Drawing Sheets

(56) References Cited

U.S. PATENT DOCUMENTS

2009/0079420 A1 3/2009 Fink et al.
2009/0237073 A1* 9/2009 Uchiyama et al. ....... 324/207.11
2010/0005343 A1* 1/2010 Yamamoto ..................... 714/44
2010/0058028 A1* 3/2010 Fan ............................. 711/217
2010/0182055 A1* 7/2010 Rozen et al. .................. 327/155

* cited by examiner

|  | NORMAL | INSTANTANEOUS INTERRUPTION | PROLONGED TIME DROP | F/F MALFUNCTION |
|---|---|---|---|---|
| 1st COMPARATOR | 0 | 1 | 1 | 0 |
| 2nd COMPARATOR | 0 | 0 | 1 | 0 |
| 3rd COMPARATOR | 0 | 1 | 1 | 1 |
| 4th COMPARATOR | 0 | 1 | 1 | 0 |
| OPERATION COMMAND OF LOGIC CIRCUIT | SW1 ON<br><br>SW2 ON<br><br>SW3 OFF<br><br>SW4 OFF | SW1 OFF<br><br>SW2 OFF<br><br>SW3 ON<br><br>SW4 OFF<br><br>STOP UPDATING OF MEMORY<br><br>OPERATE 1st RESET CIRCUIT AFTER POWER RETURNING | SW1 OFF<br><br>SW2 OFF<br><br>SW3 ON<br><br>SW4 OFF<br><br>FIX OUTPUT VALUE OF MEMORY TO Hi/Lo<br><br>OPERATE 1st & 2nd RESET CIRCUITS AFTER POWER RETURNING | SW1 OFF<br><br>SW2 OFF<br><br>SW3 ON<br><br>SW4 ON |

FIG. 5A

FIG. 5B

POSITION DETECTOR

CROSS REFERENCE TO RELATED APPLICATION

This application is based on Japanese Patent Application No. 2011-254956 filed on Nov. 22, 2011, the disclosure of which is incorporated herein by reference.

TECHNICAL FIELD

The present disclosure relates to a position detector that detects a position of a detection body.

BACKGROUND

Conventionally, a position detector has been known to detect a position of a detection body, such as an angle of rotation of a throttle valve of a vehicular electronic control throttle device, an angle of rotation of an accelerator pedal of an accelerator pedal module, the amount of stroke of a clutch actuator and the like. For example, a position detector detects the angle of rotation or the amount of stroke of a detection body such as a throttle valve by detecting a magnetic field generated from a magnet attached to the detection body using a magnetic detection IC such as a Hall IC. It is to be noted that the magnetic detection IC is an electronic component into which a magnetic field detection element and an integrated circuit for processing a signal outputted from the magnetic field detection element are integrated.

For example, U.S. Pat. No. 7,369,969 B2 describes a position detector. In the position detector described, a signal transmitted from a magnetic detection element and passing through an analog-to-digital (A/D) converter circuit is processed at a digital signal processor (DSP), and the signal processed is outputted to an external device via a digital-to-analog (D/A) converter circuit. Further, a memory is disposed between the DSP and the D/A converter circuit to store data outputted from the DSP. Moreover, monitoring circuits are provided to monitor instantaneous interruption of electric power supply to each of the circuits.

When the monitoring circuit detects the instantaneous interruption of the electric power supply to the A/D converter circuit or the DSP, the memory stops updating of the data, holds the data stored immediately before the instantaneous interruption of the electric power supply, and outputs the data to the external device through the D/A converter circuit. Therefore, the position detector keeps normal output when the instantaneous interruption of the electric power supply occurs.

In the position detector of U.S. Pat. No. 7,369,969 B2, however, the memory is disposed between the A/D converter circuit and the D/A converter circuit. Therefore, if a malfunction occurs in the memory due to deterioration of the memory or the like, it is concerned that the position detector will not ensure desired output behavior.

SUMMARY

It is an object of the present disclosure to provide a position detector that is capable of ensuring redundancy of a storage circuit and achieving desired output when a power source voltage is declined.

According to an aspect of the present disclosure, a position detector for detecting a position of a detection body based on a magnetic field generated from a magnetic field generation element equipped to the detection body includes a magnetic field detection element, a signal processing circuit, a first storage circuit, an output circuit, a second storage circuit, a first power supply circuit, a second power supply circuit, a malfunction determination circuit, and a signal route changing circuit. The magnetic field detection element outputs a signal according to the magnetic field of the magnetic field generation element. The signal processing circuit processes the signal outputted from the magnetic field detection element. The first storage circuit stores a signal processed by the signal processing circuit. The output circuit outputs the signal outputted from the first storage circuit to an external device during a normal operation mode. The second storage circuit stores an output value of the first storage circuit during the normal operation mode. The first power supply circuit supplies electric power to the signal processing circuit and the first storage circuit. The second power supply circuit supplies electric power to the second storage circuit and the malfunction determination circuit.

The malfunction determination circuit determines an instantaneous power interruption mode when the electric power supply of the first power supply circuit is instantaneously interrupted. When the malfunction determination circuit determines the instantaneous power interruption mode, the signal route changing circuit prevents a signal transmission between the first storage circuit and the second storage circuit and a signal transmission between the first storage circuit and the output circuit, prevents updating of the second storage circuit for a certain period of time, and permits the second storage circuit in which the updating is prevented to output a signal to the output circuit.

In this configuration, when the malfunction determination circuit determines the instantaneous power interruption mode, the signal route changing circuit changes a signal transmission route such that data of the second storage circuit in which the updating is stopped is outputted to the output circuit without using data of the first storage circuit. Therefore, even in a case where the first storage circuit cannot perform output due to the instantaneous power interruption, or even in a case where a malfunction occurs in the data of the first storage circuit due to the instantaneous power interruption, data of the second storage circuit, which is normal, is outputted to the output circuit. Accordingly, the position detector can ensure redundancy of the storage circuit and keep normal output when the power supply voltage is dropped.

According to another aspect of the present disclosure, a position detector for detecting a position of a detection body based on a magnetic field generated from a magnetic field generation element equipped to the detection body includes a magnetic field detection element, a signal processing circuit, a first storage circuit, an output circuit, a second storage circuit, a malfunction determination circuit, and a signal route changing circuit. The magnetic field detection element outputs a signal according to the magnetic field of the magnetic field generation element. The signal processing circuit processes the signal outputted from the magnetic field detection element. The first storage circuit stores a signal processed by the signal processing circuit. The output circuit transmits a signal outputted from the first storage circuit to an external device in a normal operation mode. The second storage circuit stores an output value of the first storage circuit in the normal operation mode.

The malfunction determination circuit determines a malfunction mode of the first storage circuit. When the malfunction determination circuit determines the malfunction mode of the first storage circuit, the signal route changing circuit changes a signal transmission route such that an output of the signal processing circuit is transmitted to the second storage circuit without passing through the first storage circuit and a signal is outputted from the second storage circuit to the output circuit, by preventing a signal transmission between the first storage circuit and the second storage circuit and a signal transmission between the first storage circuit and the output circuit, and permitting a signal transmission between the signal processing circuit and the second storage circuit and a signal transmission between the second storage circuit and the output circuit.

Therefore, when a malfunction occurs in the first storage circuit due to deterioration of the first storage circuit or the like, the position detector can maintain desired output behavior using the second storage circuit.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Hereinafter, an embodiment of the present disclosure will be described with reference to the drawings.

A position detector according to the embodiment is, for example, used as a rotation angle sensor of an electronic control throttle device that controls the amount of air suctioned into a cylinder of an internal combustion engine of a vehicle. The rotation angle sensor outputs a voltage signal indicating an opening degree of a throttle valve to an electronic control unit (ECU) of the vehicle. According to the voltage signal, the ECU outputs a drive signal to a motor that drives the throttle valve such that the throttle valve has an opening degree suitable for a driving state of the internal combustion engine. Thus, the motor drives the throttle valve to a target opening degree to thereby control the amount of suction air.

Figure 1:
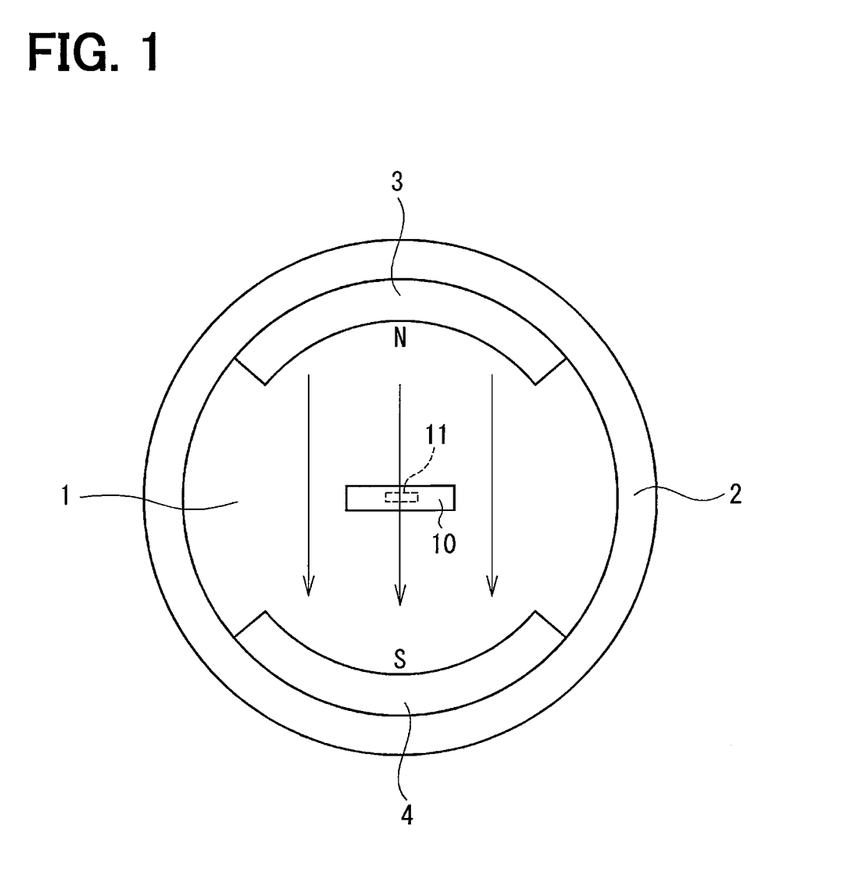
FIG. 1 is a schematic diagram of a position detector according to an embodiment of the present disclosure.

As shown in FIG. 1, a cylindrical yoke 2 is fixed to an end of a throttle valve 1 as a detection body, and two permanent magnets 3, 4 are fixed to an inner diameter side of the yoke 2. The permanent magnets 3, 4 correspond to a magnetic field generation element. In FIG. 1, a magnetic flux flowing between the two permanent magnets 3, 4 is schematically illustrated by arrows.

The rotation angle sensor is a magnetic field detection IC 10 that is disposed rotatable relative to the permanent magnets 3, 4 and the yoke 2. The magnetic field detection IC 10 is an electronic component into which a magnetic field detection element 11 and an integrated circuit for processing a signal outputted from the magnetic field detection element 11 are integrated. The magnetic field detection element 11 is, for example, a Hall element or a magnetoresistive effect element.

When the rotation angle sensor and the permanent magnets 3, 4 rotate relative to each other, the density of magnetic flux passing through a magnetosensitive surface of the magnetic field detection element 11 changes. The magnetic field detection element 11 outputs a signal according to the change in the magnetic flux density.

Figure 2:
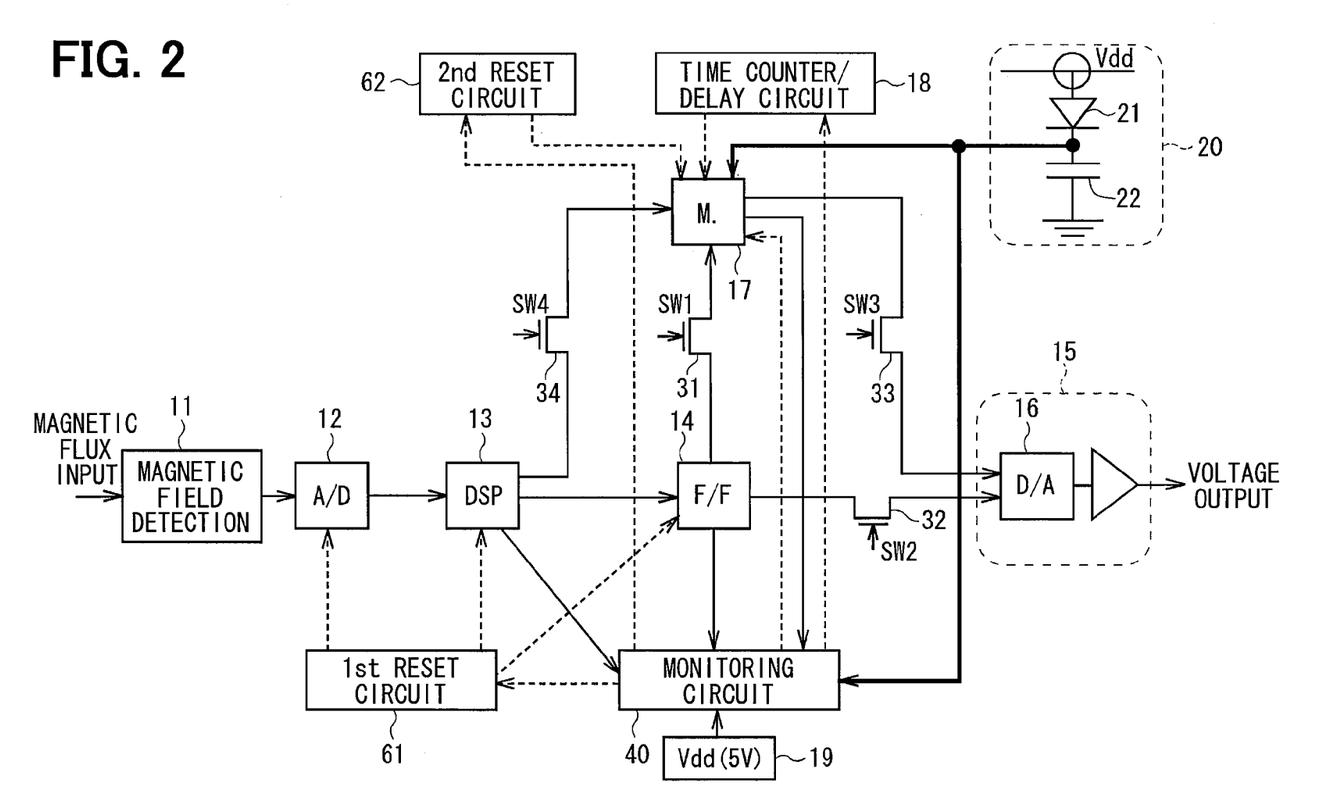
FIG. 2 is a block diagram of an electric circuit of the position detector according to the embodiment.
Figure 3:
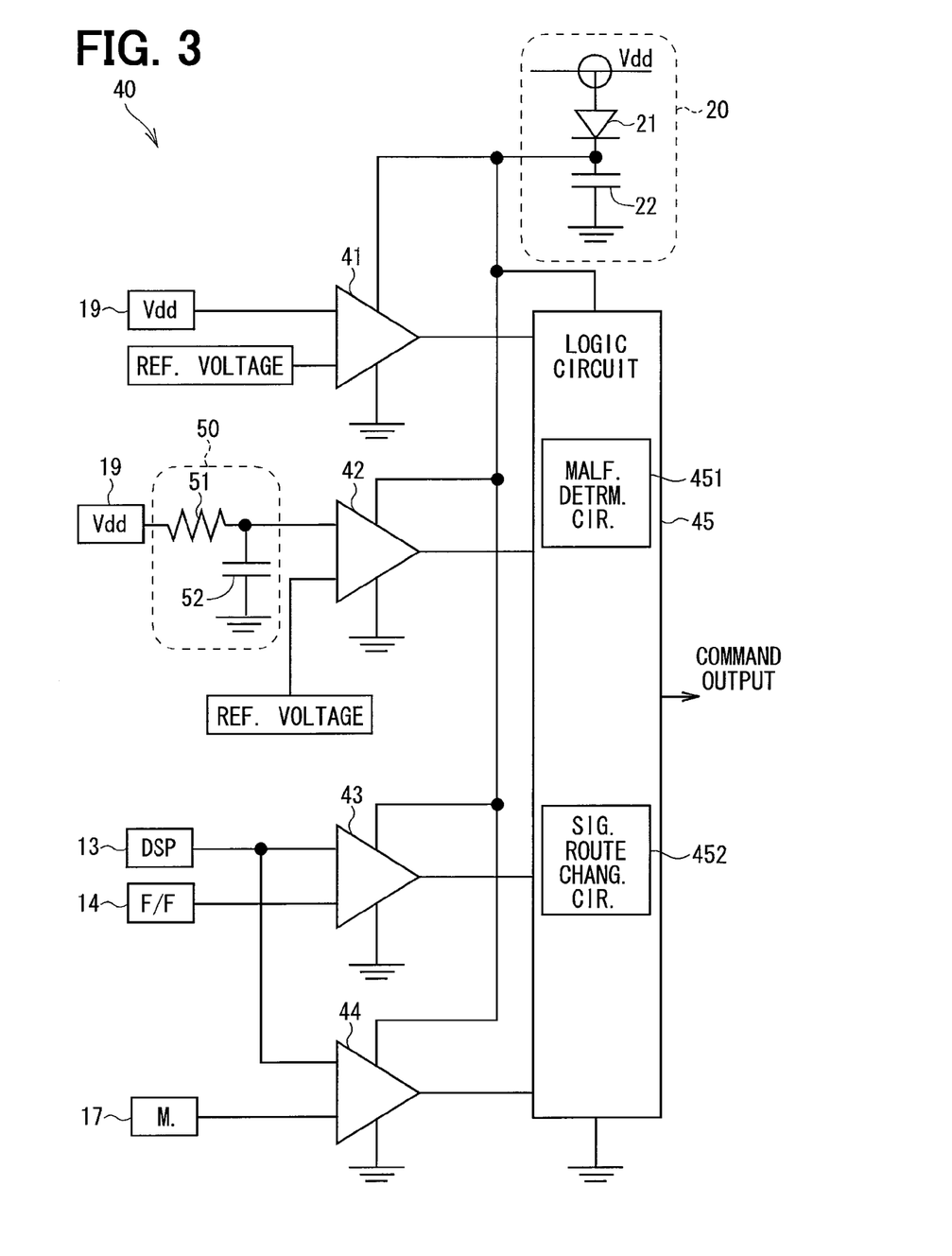
FIG. 3 is a circuit diagram of a monitoring circuit of the position detector according to the embodiment.

A circuit of the magnetic field detection IC 10 is shown in FIGS. 2 and 3. In FIG. 2, a route of a sensor signal is shown by a solid line, a route of a command signal is shown by a dashed line, and a route of supplied power is shown by a thick line.

The magnetic field detection IC 10 includes the magnetic field detection element 11, an analog-to-digital converter circuit (hereinafter referred to as the A/D) 12, a digital signal processor (hereinafter referred to as the DSP) 13 as a signal processing circuit, a flip flop (hereinafter referred to as the F/F) 14 as a first storage circuit, a digital-to-analog converter circuit (hereinafter referred to as the D/A) 16 constituting an output circuit 15, a memory 17 as a second storage circuit.

The A/D 12 converts an analog signal outputted from the magnetic field detection element 11 into a digital signal. The DSP 13 performs a correction processing and a rotation angle calculation processing with respect to the digital signal converted by the A/D 12. The F/F 14 stores the signal outputted from the DSP 13 and outputs the signal to the D/A 16 and the memory 17. The D/A 16 converts the digital signal outputted from the F/F 14 into an analog signal, and outputs the analog signal to a non-illustrated ECU disposed outside. The memory 17 mirrors and stores the digital signal outputted from the F/F 14. The memory 17 is connected to a time counter or delay circuit 18.

A first power supply circuit (hereinafter referred to as the Vdd) 19 supplies electric power to the A/D 12, the DSP 13, the F/F 14, the D/A 16, the time counter 18 and the like. The voltage of the Vdd 19 is, for example, 5V. It is to be noted that, in FIG. 2, wirings for supplying the electric power from the Vdd 19 to each of the circuits are not illustrated.

A second power supply circuit 20 includes a Zener diode 21 connected to the Vdd 19, and a capacitor 22 disposed between the Zener diode 21 and a ground. The second power supply circuit 20 supplies electric power to the memory 17 and a monitoring circuit 40. The voltage charged at the capacitor 22 is supplied to the memory 17 and the monitoring circuit 40 as a power source at the time of an instantaneous power interruption and at the beginning of the prolonged time power drop.

A first switch 31 is disposed on a wiring connecting between the F/F 14 and the memory 17. A second switch 32 is disposed on a wiring connecting between the F/F 14 and the D/A 16. A third switch 33 is disposed on a wiring connecting between the memory 17 and the D/A 16. A fourth switch 34 is disposed on a wiring connecting between the DSP 13 and the memory 17. The first through fourth switches 31, 32, 33, 34 are, for example, provided by electric field effect transistors.

FIG. 3 shows details of the monitoring circuit 40. The monitoring circuit 40 includes first through fourth comparators 41, 42, 43, 44 as first through fourth comparator circuits, a logic circuit 45, and the like. The logic circuit 45 serves as a malfunction determination circuit and a signal route changing circuit. For example, the logic circuit 45 includes a malfunction determination circuit 451 and a signal route changing circuit 452. The first through fourth comparators 41, 42, 43, 44 and the logic circuit 45 are supplied with electric power from the second power supply circuit 20.

The first comparator 41 compares the voltage supplied from the Vdd 19 to each circuit and a reference voltage. The reference voltage is set to a voltage (e.g., 3.5V) equal to or higher than a voltage that enables operations of the A/D 12, the DSP 13, the F/F 14, the D/A 16 and the like. The first comparator 41 outputs "0" when the voltage of the Vdd 19 is higher than the reference voltage, and outputs "1" when the voltage of the Vdd 19 is lower than the reference voltage.

The second comparator 42 compares the voltage supplied from the Vdd 19 via a low-pass filter 50 and the reference voltage. The low-pass filter 50 is a filter circuit including a resistor 51 connected in series to the Vdd 19, and a capacitor 52 connected in parallel with the Vdd 19. The low-pass filter 50 corresponds to a delay circuit. The second comparator 42 outputs "0" when the voltage supplied from the Vdd 19 via the low-pass filter 50 is higher than the reference voltage, and outputs "1" when the voltage supplied from the Vdd 19 via the low-pass filter 50 is lower than the reference voltage.

The third comparator 43 compares the output value of the DSP 13 and the output value of the F/F 14. The third comparator 43 outputs "0" when the output value of the DSP 13 and the output value of the F/F 14 are the same, and outputs "1" when the output value of the DSP 13 and the output value of the F/F 14 are different.

The fourth comparator 44 compares the output value of the DSP 13 and the output value of the memory 17. The fourth comparator 44 outputs "0" when the output value of the DSP 13 and the output value of the memory 17 are the same, and outputs "1" when the output value of the DSP 13 and the output value of the memory 17 are different.

The logic circuit 45 determines "normal operation mode", "instantaneous power interruption mode", "prolonged time power drop mode" and "F/F malfunction mode" based on the outputs of the first through fourth comparators 41, 42, 43, 44. A determination chart of the logic circuit 45 for determination of each of the modes described above, and commands outputted to each circuit from the logic circuit 45 in the determination will be described hereinafter with reference to FIG. 4.

(Normal Operation Mode)

Figure 4:
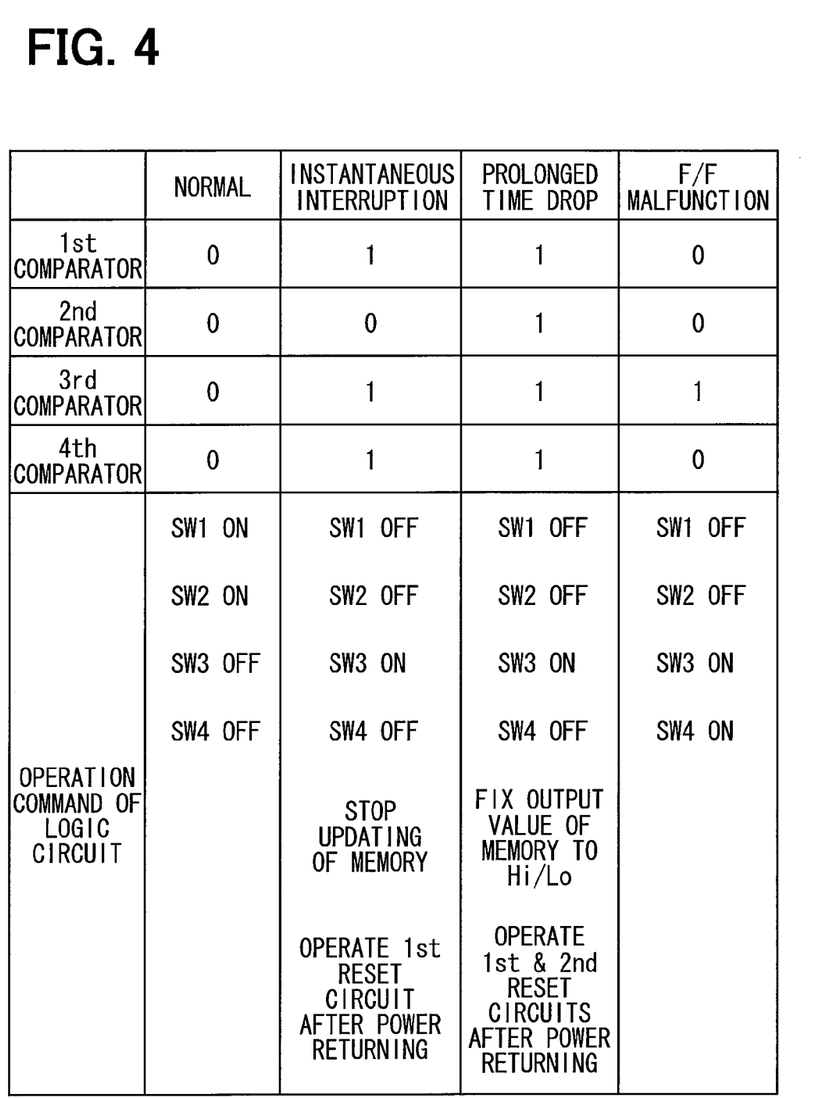
FIG. 4 is a determination chart of a logic circuit of the position detector according to the embodiment.

The logic circuit 45 determines the normal operation mode where the circuits of the magnetic field detection IC 10 are normally operated when all the outputs of the first through fourth comparators 41, 42, 43, 44 indicate "0". In this case, the logic circuit 45 turns on the first switch 31 and the second switch 32, and turns off the third switch 33 and the fourth switch 34. Therefore, a signal transmission route of "the magnetic field detection element 11→the A/D 12→the DSP 13→the F/F 14→the D/A 16 and the memory 17" is formed, and the memory 17 mirrors the signal outputted from the F/F 14 and stores the signal mirrored.

(Instantaneous Power Interruption Mode)

The logic circuit 45 determines the instantaneous power interruption mode, when the output of the first comparator 41 indicates "1" and the output of the second comparator 42 indicates "0". This is because, when the instantaneous power interruption where the electric power supply of the Vdd 19 is instantaneously interrupted occurs, the voltage supplied from the Vdd 19 via the low-pass filter 50 is maintained at a normal value whereas the voltage of the Vdd 19 is dropped. In this case, the logic circuit 45 turns off the first, second and fourth switches 31, 32, 34 and prevents updating of the memory 17 for a certain period of time. Further, the logic circuit 45 turns on the third switch 33 to output the signal of the memory 17 in which the updating is prevented to the D/A 16. In this case, the memory 17 and the monitoring circuit 40 are supplied with electric power from the capacitor 22.

Thereafter, when the electric power supply of the Vdd 19 returns and the outputs of the first comparator 41 and the second comparator 42 indicate "0", the logic circuit 45 resets the A/D 12, the DSP 13 and the F/F 14 within a predetermined period of time by means of the first reset circuit 61. After the predetermined period of time has elapsed from the time the electric power supply returns, the logic circuit 45 returns the route to the normal operation mode by turning on the first switch 31 and the second switch 32, and turning off the third switch 33 and the fourth switch 34. Therefore, the A/D 12, the DSP 13, the F/F 14 and the memory 17 are normally operated. It is to be noted that the predetermined period of time is a period of time required to reset the A/D 12, the DSP 13 and the F/F 14, and is counted by the time counter or delay circuit 18.

(Prolonged Time Power Drop Mode)

The logic circuit 45 determines the prolonged time power drop mode when the outputs of the first comparator 41 and the second comparator 42 indicate "1". This is because the voltage of the Vdd 19 and the voltage supplied from the Vdd 19 via the low-pass filter 50 are both dropped when a prolonged time power drop occurs.

When the logic circuit 45 determines the prolonged time power drop, the logic circuit 45 turns off the first, second fourth switches 31, 32, 34 and fixes the signal outputted from the memory 17 to a Hi level (Hi) or a Low level (Lo). Further, the logic circuit 45 turns on the third switch 33 to output the fixed signal of the memory 17 to the D/A 16. At the beginning of the prolonged time power drop, the memory 17 and the monitoring circuit 40 are supplied with electric power from the capacitor 22.

Thereafter, when the electric power supply of the Vdd 19 returns and the outputs of the first comparator 41 and the second comparator 42 indicate "0", the logic circuit 45 resets the A/D 12, the DSP 13 and the F/F 14 within a predetermined period of time by means of the first reset circuit 61. After the predetermined period of time has elapsed from the time the electric power supply returns, the logic circuit 45 returns the route to the normal operation mode by turning on the first switch 31 and the second switch 32, and turning off the third switch 33 and the fourth switch 34, and resets the memory 17 by means of the second reset circuit 62. Therefore, the A/D 12, the DSP 3, the F/F 14 and the memory 17 are normally operated.

Next, the signal of the memory 17 fixed in the prolonged time power drop mode will be described.

Figure 5A:
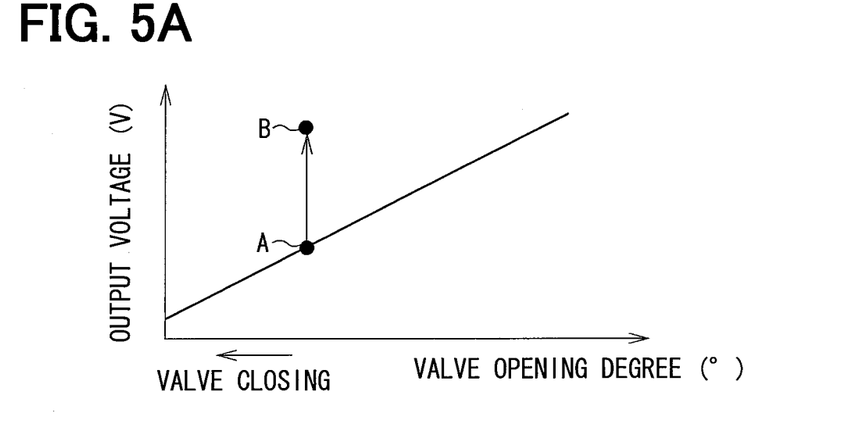
FIGS. 5A and 5B are graphs each illustrating a signal outputted from the position detector in a prolonged time power drop according to the embodiment.
Figure 5B:
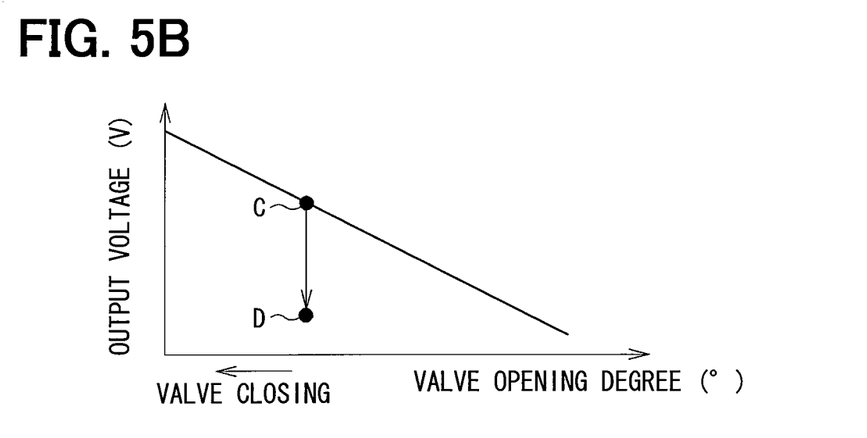

FIG. 5A and FIG. 5B are graphs illustrating a relationship between the valve opening degree and the output voltage in regard to the two magnetic field detection ICs having different output properties.

The magnetic field detection IC of FIG. 5A has an output property where the output voltage increases with an increase in the opening degree of the throttle valve 1. In the case of this magnetic field detection IC 10, when the prolonged time power drop mode is determined, the logic circuit 45 fixes the signal outputted from the memory 17 to a high-side (e.g., "Hi" or high level). That is, the output voltage increases from a voltage A of the normal operation mode to a voltage B of the prolonged time power drop mode.

In this case, the ECU to which the signal from the magnetic field detection IC 10 is inputted determines that the opening degree of the throttle valve 1 is greater than a target opening degree. Therefore, the ECU outputs a driving signal to the motor that drives the throttle valve 1 to move the throttle valve 1 in a valve closing direction to set the opening degree at the target opening degree. Accordingly, the throttle valve 1 is controlled to the safe side.

The magnetic field detection IC of FIG. 5B has an output property where the output voltage reduces with the increase in the opening degree of the throttle valve 1. In the case of this magnetic field detection IC 10, when the prolonged time power drop mode is determined, the logic circuit 45 fixes the signal outputted from the memory 17 to a low-side (e.g., "Lo" or low level). That is, the output voltage reduces from a voltage C of the normal operation mode to a voltage D of the prolonged time power drop mode.

In this case, the ECU to which the signal from the magnetic field detection IC 10 is inputted determines that the opening degree of the throttle valve 1 is greater than the target opening degree. Therefore, the ECU outputs a driving signal to the motor to move the throttle valve 1 in a valve closing direction such that the opening degree of the throttle valve 1 is set at the target opening degree. According the throttle valve 1 is controlled to the safe side.

(F/F Malfunction Mode)

As shown in FIG. 4, when the output of the third comparator 43 indicates "1" and the output of the fourth comparator 44 indicates "0", the logic circuit 45 determines the F/F malfunction mode. This is because, when the F/F 14 malfunctions, the output value of the memory 17 is maintained at a normal value during one clock as the sensor signal outputted from the DSP 13 is inputted into the memory 17 after one clock delayed while passing through the F/F 14. In this case, the logic circuit 45 turns off the first and second switches 31, 32 and turns on the third and fourth switches 33, 34. Thus, the logic circuit 45 switches the signal transmission route "the DSP 13→the F/F 14→the D/A 16" of the normal operation mode to the route "the DSP 13→the memory 17→the D/A 16" of the F/F malfunction mode.

In the embodiment described above, the following advantageous effects will be achieved.

(1) When the instantaneous power interruption mode is determined, the signal transmission route is changed in such a manner that the signal transmission route from the F/F 14 to the D/A 16 and the signal transmission route from the F/F 14 to the memory 17 are prevented, and the data of the memory 17 in which the updating is prevented is outputted to the D/A 16. Therefore, even when the output of the F/F 14 is stopped due to the instantaneous power interruption, or even when a malfunction occurs in the data of the F/F 14 due to the instantaneous power interruption, the data of the memory 17 which is in normal is outputted to the D/A 16. Accordingly, the magnetic field detection IC 10 maintains redundancy of a storage circuit by the F/F 14 and the memory 17, as well as keeps normal output when the voltage of the Vdd 19 is dropped.

(2) When the prolonged time power drop mode is detected, the signal of the memory 17 is fixed to the high level (Hi) or the low level (Lo). The signal in this case is set beforehand to the signal that enables the vehicle to control in the safe side. Therefore, the magnetic field detection IC 10 enables the vehicle to be controlled to the safe side when the electric power supply is dropped for a long time.

(3) When the electric power supply is returned from the instantaneous drop or the prolonged time drop, the logic circuit 45 returns the signal transmission route to the route of the normal operation mode after the first reset circuit 61 resets the signal processing circuit and the F/F 14. Therefore, it is less likely that the signals will be outputted from the DSP 13 and the F/F 14 during the resetting.

(4) Since the second power supply circuit 20 is provided by the Zener diode 21 and the capacitor 22, the structure of the second power supply circuit 20 is simplified.

(5) When the F/F malfunction mode is determined, the logic circuit 45 switches the signal transmission route from the route "the DSP 13→the F/F 14→the D/A 16" to the route "the DSP 13→the memory 17→the D/A 16". Therefore, it is possible to maintain desired output behavior using the memory 17, and to elongate usable life of the magnetic field detection IC 10.

Other Embodiments

In the embodiment described above, it is described about the magnetic field detection IC as the rotation angle sensor used in the electronic control throttle mounted in the vehicle. However, the position detector of the present disclosure can be used for various sensors such as a rotation angle sensor of an accelerator pedal of an accelerator pedal module, a rotation angle sensor of a tumble control valve, and a sensor detecting a stroke amount of a clutch actuator.

Summarizing the above, in an embodiment, a position detector for detecting a position of a detection body based on a magnetic field generated from a magnetic field generation element 3, 4 equipped to the detection body includes a magnetic field detection element 11, a signal processing circuit 13, a first storage circuit 14, an output circuit 15, a second storage circuit 17, a first power supply circuit 19, a second power supply circuit 20, a malfunction determination circuit 451, and a signal route changing circuit 452. The magnetic field detection element 11 outputs a signal according to the magnetic field of the magnetic field generation element 3, 4. The signal processing circuit 13 processes the signal outputted from the magnetic field detection element 11. The first storage circuit 14 stores a signal processed by the signal processing circuit 13. The output circuit 15 outputs a signal outputted from the first storage circuit 14 to an external device during a normal operation mode. The second storage circuit 17 stores an output value of the first storage circuit 14 during the normal operation mode. The first power supply circuit 19 supplies electric power to the signal processing circuit 13 and the first storage circuit 14. The second power supply circuit 20 supplies electric power to the second storage circuit 17 and the malfunction determination circuit 451.

The malfunction determination circuit 451 determines an instantaneous power interruption mode where the electric power supply of the first power supply circuit 19 is instantaneously interrupted. When the malfunction determination circuit 451 determines the instantaneous power interruption mode, the signal route changing circuit 452 prevents a signal transmission between the first storage circuit 14 and the second storage circuit 17 and a signal transmission between the first storage circuit 14 and the output circuit 15, prevents the second storage circuit 17 from updating data for a certain period of time, and permits output of a signal from the second storage circuit 17 in which the updating is prevented to the output circuit 15.

In this configuration, when the malfunction determination circuit 451 determines the instantaneous power interruption mode, the signal route changing circuit 452 changes a signal transmission route such that data of the second storage circuit 17 in which the updating is prevented is outputted to the output circuit 15 without using data of the first storage circuit 14. Therefore, even in a case where the first storage circuit 14 cannot perform output due to the instantaneous power interruption, or even in a case where a malfunction occurs in the data of the first storage circuit 14 due to the instantaneous power interruption, data of the second storage circuit 17, which is normal, is outputted to the output circuit 15. Accordingly, the position detector can ensure redundancy of a storage circuit and keeps normal output when the power supply voltage is dropped.

For example, the malfunction determination circuit 451 may determine the normal operation mode when the first power supply circuit 19 supplies the electric power to the signal processing circuit 13 and the first storage circuit 14. When the malfunction determination circuit 451 determines the normal operation mode, the signal route changing circuit 452 may permit the signal transmission between the first storage circuit 14 and the second storage circuit 17 and the signal transmission between the first storage circuit 14 and the output circuit 15, prevent a signal transmission between the signal processing circuit 13 and the second storage circuit 17 and the signal transmission between the second storage circuit 17 and the output circuit 15. Therefore, in the normal operation mode, the second storage circuit 17 mirrors and stores the data of the first storage circuit 14.

For example, the position detector may include a delay circuit 50, a first comparator circuit 41, and a second comparator circuit 42. The delay circuit 50 may be connected to the first power supply circuit 19. The first comparator circuit 41 may compare a voltage supplied from the first power supply circuit 19 to the signal processing circuit 13 and the first storage circuit 14 to a reference voltage set equal to or greater than a voltage that enables operation of the signal processing circuit 13 and the first storage circuit 14. The second comparator circuit 42 may compare a voltage supplied via the delay circuit 50 from the first power supply circuit 19 to the signal processing circuit 13 and the first storage circuit 14 to the reference voltage.

In this case, when the first comparator circuit 41 detects that the voltage supplied from the first power supply circuit 19 is lower than the reference voltage, and the second comparator circuit 42 detects that the voltage supplied via the delay circuit 50 from the first voltage supply circuit 19 is higher than the reference voltage, the malfunction determination circuit 451 may determine the instantaneous power interruption mode where the electric power supply of the first power supply circuit 19 is instantaneously interrupted. When the instantaneous power interruption occurs, the voltage of the first power supply circuit 19 drops while the voltage supplied from the first power supply circuit 19 via the delay circuit 50 does not drop. Therefore, the malfunction determination circuit 451 may determine the instantaneous power interruption mode based on the signals of the first comparator circuit 41 and the second comparator circuit 42.

For example, the malfunction determination circuit 451 may determine a prolonged time power drop mode when the first comparator circuit 41 detects that the voltage supplied from the first power supply circuit 19 is lower than the reference voltage as well as the second comparator circuit 42 detects that the voltage supplied from the first power supply circuit 19 via the delay circuit 50 is lower than the reference voltage. When the malfunction determination circuit 451 determines the prolonged time power drop mode, the signal route changing circuit 452 may prevent the signal transmission between the first storage circuit 14 and the second storage circuit 17, the signal transmission between the first storage circuit 14 and the output circuit 15, and the signal transmission between the signal processing circuit 13 and the second storage circuit 17, fix the signal outputted from the second storage circuit 17 to a high level or a low level, and permit the signal transmission between the second storage circuit 17 and the output circuit 15 so as to output the fixed signal of the second storage circuit 17 to the output circuit 15. The position detector may be used for each sensor of a vehicle. In such a case, since the signal outputted from the position detector in the prolonged time power drop mode is set beforehand to the high level or the low level, which is capable of controlling the vehicle to a safe side, the position detector can cope with the prolonged power drop.

For example, the position detector may include a first reset circuit 61 that resets the signal processing circuit 13 and the first storage circuit 14 within a predetermined period of time after the electric power supply returns from the instantaneous power interruption mode or the prolonged time power drop mode. After the predetermined period of time has elapsed from the time the electric power supply is returned, the signal route changing circuit 452 may permit the signal transmission between the first storage circuit 14 and the second storage circuit 17 and the signal transmission between the first storage circuit 14 and the output circuit 15, and prevent the signal transmission between the second storage circuit 17 and the output circuit 15, thereby to return the signal transmission route to the route of the normal operation mode. Therefore, the position detector restricts the signal from being outputted from the signal processing circuit 13 and the first storage circuit 14 to the output circuit 15 during a resetting operation of the first storage circuit 14. The predetermined period of time may be a period of time that the first reset circuit 61 requires to rest the signal processing circuit 13 and the first storage circuit 14.

For example, the position detector may include a second reset circuit 62 that resets the second storage circuit 17 after the predetermined period of time elapses from the time the electric power supply returns from the prolonged time power drop mode. In this case, the position detector can operate normally the second storage circuit 17 after the electric power supply returns. Further, since the second storage circuit 17 is reset after returning to the normal operation mode, the position detector restricts the signal from being outputted from the second storage circuit 17 to the output circuit 15 during a resetting operation of the second storage circuit 17.

For example, the second power supply circuit 20 may include a Zener diode 21 connected to the first power supply circuit 19 and a capacitor 22 disposed between the Zener diode 21 and a ground. A voltage of the capacitor 22 may be used as a power source of the electric power supplied to the second storage circuit 17 in the instantaneous power interruption mode and at the beginning of the prolonged time power drop mode. In this case, the second power supply circuit is provided by a simple structure.

For example, the position detector may include a third comparator circuit 43 and a fourth comparator circuit 44. The third comparator circuit 43 may compare an output value of the signal processing circuit 13 and the output value of the first storage circuit 14. The fourth comparator circuit 44 may compare the output value of the signal processing circuit 13 and an output value of the second storage circuit 17. When the third comparator circuit 43 detects that the output value of the signal processing circuit 13 and the output value of the first storage circuit 14 are different, and the fourth comparator circuit 44 detects that the output value of the signal processing circuit 13 and the output value of the second storage circuit 17 are the same, the malfunction determination circuit 451 may determine a malfunction mode of the first storage circuit 14. When the malfunction determination circuit 451 determines the malfunction mode of the first storage circuit 19, the signal route changing circuit 452 may change a signal transmission route such that the signal outputted from the signal processing circuit 13 is transmitted to the second storage circuit 17 without passing through the first storage circuit 14 and the signal is transmitted from the second storage circuit 17 to the output circuit 15, by preventing the signal transmission between the first storage circuit 14 and the second storage circuit 17 and the signal between the first storage circuit 14 and the output circuit 15, and permitting the signal transmission between the signal processing circuit 13 and the second storage circuit 17 and the signal transmission between the second storage circuit 17 and the output circuit 15. Therefore, when a malfunction occurs in the first storage circuit 14 due to deterioration of the first storage circuit 14 or the like, the signal route changing circuit 452 changes the signal transmission route such that the signal is transmitted from the signal processing circuit 13 to the output circuit 15 via the second storage circuit 17. Accordingly, the position detector can maintain desired output behavior using the second storage circuit 17, and hence durable period can be increased.

In an embodiment, a position detector for detecting a position of a detection body based on a magnetic field generated from a magnetic field generation element 3, 4 equipped to the detection body may include a magnetic field detection element 11, a signal processing circuit 13, a first storage circuit 14, an output circuit 15, a second storage circuit 17, a malfunction determination circuit 451, and a signal route changing circuit 452. The magnetic field detection element 11 may output a signal according to the magnetic field of the magnetic field generation element 3, 4. The signal processing circuit 13 may process the signal outputted from the magnetic field detection element 11. The first storage circuit 14 may store a signal processed by the signal processing circuit 13. The output circuit 15 may output a signal outputted from the first storage circuit 14 to an external device in a normal operation mode. The second storage circuit 17 may store an output value of the first storage circuit 14 in the normal operation mode.

The malfunction determination circuit 451 may determine a malfunction mode of the first storage circuit 14. When the malfunction determination circuit 451 determines the malfunction mode of the first storage circuit 14, the signal route changing circuit 451 may change a signal transmission route such that the output of the signal processing circuit 13 is transmitted to the second storage circuit 17 without passing through the first storage circuit 14 and a signal is outputted from the second storage circuit 17 to the output circuit 15, by preventing a signal transmission between the first storage circuit 14 and the second storage circuit 17 and the signal between the first storage circuit 14 and the output circuit 15, and permitting a signal transmission between the signal processing circuit 13 and the second storage circuit 17 and a signal transmission between the second storage circuit 17 and the output circuit 15.

Therefore, when a malfunction occurs in the first storage circuit 14 due to deterioration of the first storage circuit 14 or the like, the position detector can maintain desired output behavior using the second storage circuit 17.

For example, the position detector may include a third comparator circuit 43 and a fourth comparator circuit 44. The third comparator circuit 43 may compare an output value of the signal processing circuit 13 and the output value of the first storage circuit 14. The fourth comparator circuit may compare the output value of the signal processing circuit 13 and an output value of the second storage circuit 17. When the third comparator circuit 43 detects that the output value of the signal processing circuit 13 and the output value of the first storage circuit 14 are different and the fourth comparator circuit 44 detects that the output value of the signal processing circuit 13 and the output value of the second storage circuit 17 are the same, the malfunction determination circuit may determine the malfunction mode of the first storage circuit 14. Because the signal outputted from the signal processing circuit 13 is inputted to the second storage circuit 17 after passing through the first storage circuit 14, the second storage circuit 17 receives a delayed signal. Therefore, when a malfunction occurs in the first storage circuit 14, the output value of the signal processing circuit 13 and the output value of the first storage circuit 14 are different, and the output value of the signal processing circuit 13 and the output value of the second storage circuit 17 are the same. Accordingly, the malfunction determination circuit may determine the malfunction mode of the first storage circuit 14 based on the signals of the third comparator circuit 43 and the fourth comparator circuit 44.

While only the selected exemplary embodiment and modifications have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A position detector for detecting a position of a detection body based on a magnetic field generated from a magnetic field generation element equipped to the detection body, the position detector comprising:
   a magnetic field detection element outputting a signal according to the magnetic field of the magnetic field generation member;
   a signal processing circuit processing the signal outputted from the magnetic field detection element;
   a first storage circuit storing a signal processed by the signal processing circuit;
   an output circuit outputting a signal outputted from the first storage circuit to an external device in a normal operation mode;
   a second storage circuit storing an output value of the first storage circuit in the normal operation mode;
   a first power supply circuit supplying electric power to the signal processing circuit and the first storage circuit;
   a malfunction determination circuit determining an instantaneous power interruption mode when electric power supply of the first power supply circuit is instantaneously interrupted;
   a second power supply circuit supplying electric power to the second storage circuit and the malfunction determination circuit;
   a signal route changing circuit preventing a signal transmission between the first storage circuit and the second storage circuit and a signal transmission between the first storage circuit and the output circuit, preventing the second storage circuit from updating data for a certain period of time, and permitting the second storage circuit, in which updating of the data is prevented, to output a signal to the output circuit, when the malfunction determination circuit determines the instantaneous power interruption mode;
   a delay circuit connected to the first power supply circuit;
   a first comparator circuit comparing a voltage supplied from the first power supply circuit to the signal processing circuit and the first storage circuit to a reference voltage that is set equal to or higher than a voltage enabling operation of the signal processing circuit and the first storage circuit; and
   a second comparator circuit comparing a voltage supplied from the first power supply circuit via the delay circuit to the reference voltage, wherein:
   the malfunction determination circuit determines the instantaneous power interruption mode when the first comparator circuit detects that the voltage supplied from the first power supply circuit is lower than the reference voltage and the second comparator circuit detects that the voltage supplied from the first power supply circuit via the delay circuit is higher than the reference voltage;

the malfunction determination circuit determines a prolonged time power drop mode when the first comparator circuit detects that the voltage supplied from the first power supply circuit is lower than the reference voltage and the second comparator circuit detects that the voltage supplied from the first power supply circuit via the delay circuit is lower than the reference voltage;

when the malfunction determination circuit determines the prolonged time power drop mode, the signal route changing circuit prevents the signal transmission between the first storage circuit and the second storage circuit, the signal transmission between the first storage circuit and the output circuit, and a signal transmission between the signal processing circuit and the second storage circuit, fixes the signal outputted from the second storage circuit to one of a high level and a low level, permits a signal transmission between the second storage circuit and the output circuit such that a fixed signal of the second storage circuit is outputted to the output circuit;

the second power supply circuit includes a Zener diode connected to the first power supply circuit and a capacitor connected between the Zener diode and a ground; and a voltage of the capacitor is used as a power source of the electric power supplied to the second storage circuit in the instantaneous power interruption mode and at a beginning time of the prolonged time power drop mode.

2. The position detector according to claim 1, wherein the malfunction determination circuit determines the normal operation mode when the first power supply circuit supplies the electric power to the signal processing circuit and the first storage circuit, and when the malfunction determination circuit determines the normal operation mode, the signal route changing circuit permits the signal transmission between the first storage circuit and the second storage circuit and the signal transmission between the first storage circuit and the output circuit, and prevents a signal transmission between the signal processing circuit and the second storage circuit and a signal transmission between the second storage circuit and the output circuit.

3. The position detector according to claim 1, comprising:

a third comparator circuit comparing an output value of the signal processing circuit and the output value of the first storage circuit; and a fourth comparator circuit comparing the output value of the signal processing circuit and an output value of the second storage circuit, wherein the malfunction determination circuit determines a malfunction mode of the first storage circuit when the third comparator circuit detects that the output value of the signal processing circuit and the output value of the first storage circuit are different and the fourth comparator circuit detects that the output value of the signal processing circuit and the output value of the second storage circuit are the same, and when the malfunction determination circuit determines the malfunction mode of the first storage circuit, the signal route changing circuit changes the signal transmission route such that the signal of the signal processing circuit is transmitted to the second storage circuit without passing through the first storage circuit and the signal of the second storage circuit is transmitted to the output circuit, by preventing the signal transmission between the first storage circuit and the second storage circuit and the signal transmission between the first storage circuit and the output circuit, and permitting a signal transmission between the signal processing circuit and the second storage circuit and a signal transmission between the second storage circuit and the output circuit.

4. The position detector according to claim 1, comprising a first reset circuit resetting the signal processing circuit and the first storage circuit within a predetermined period of time from a time the electric power supply returns from one of the instantaneous power interruption mode and the prolonged time power drop mode, wherein the signal route changing circuit returns the signal transmission route to the normal operation mode after the predetermined period of time elapses from the time the electric power supply returns, by permitting the signal transmission between the first storage circuit and the second storage circuit, and the signal transmission between the first storage circuit and the output circuit, and preventing the signal transmission between the second storage circuit and the output circuit.

5. The position detector according to claim 4, comprising a second reset circuit resetting the second storage circuit after the predetermined period of time elapses from the time the electric power supply returns from the prolonged time power drop mode.

6. A position detector for detecting a position of a detection body based on a magnetic field generated from a magnetic field generation element equipped to the detection body, the position detector comprising:

a magnetic field detection element outputting a signal according to the magnetic field of the magnetic field generation member;

a signal processing circuit processing the signal outputted from the magnetic field detection element;

a first storage circuit storing a signal processed by the signal processing circuit;

an output circuit outputting a signal outputted from the first storage circuit to an external device in a normal operation mode;

a second storage circuit storing an output value of the first storage circuit in the normal operation mode;

a malfunction determination circuit determining a malfunction mode of the first storage circuit, an instantaneous power interruption mode of the first power supply circuit and a prolonged time power drop mode of the first power supply circuit;

a second power supply circuit supplying electric power to the second storage circuit and the malfunction determination circuit; and a signal route changing circuit changing a signal transmission route, wherein, when the malfunction determination circuit determines the malfunction mode of the first storage circuit, the signal route changing circuit prevents a signal transmission between the first storage circuit and the second storage circuit and a signal transmission between the first storage circuit and the output circuit and permits a signal transmission between the signal processing circuit and the second storage circuit and a signal transmission between the second storage circuit and the output circuit, such that a signal of the signal processing circuit is transmitted to the second storage circuit without passing through the first storage circuit and a signal of the second storage circuit is transmitted to the output circuit, wherein the second power supply circuit includes a Zener diode connected to the first power supply circuit and a capacitor connected between the Zener diode and a ground, and a voltage of the capacitor is used as a power source of the electric power supplied to the second storage circuit in the instantaneous power interruption mode and at a beginning time of the prolonged time power drop mode.

7. The position detector according to claim 6, comprising:

a first comparator circuit comparing an output value of the signal processing circuit and the output value of the first storage circuit; and a second comparator circuit comparing the output value of the signal processing circuit and an output value of the second storage circuit, wherein the malfunction determination circuit determines the malfunction mode of the first storage circuit when the first comparator circuit detects that the output value of the signal processing circuit and the output value of the first storage circuit are different and the second comparator circuit detects that the output value of the signal processing circuit and the output value of the second storage circuit are the same.

* * * * *